United States Patent
Kuechler et al.

(12)

(10) Patent No.: US 7,972,131 B2
(45) Date of Patent: Jul. 5, 2011

(54) PLASTIFICATION AND INJECTION UNIT WITH BACK-FLOW BARRIER

(75) Inventors: Olaf Kuechler, Volkertshausen (DE); Edwin Baumann, Ratshausen (DE); Volker Krell, Neuhausen (DE)

(73) Assignee: Klöckner Desma Elastomertechnik GmbH, Frideingen an der Donau (DE)

( * ) Notice: Subject to any disclaimer, the term of this patent is extended or adjusted under 35 U.S.C. 154(b) by 42 days.

(21) Appl. No.: 12/592,090

(22) Filed: Nov. 19, 2009

(65) Prior Publication Data
US 2010/0151074 A1  Jun. 17, 2010

(30) Foreign Application Priority Data

Dec. 15, 2008 (DE) .................. 10 2008 061 845
Feb. 12, 2009 (DE) .................. 10 2009 008 590

(51) Int. Cl.
*B29C 45/60* (2006.01)

(52) U.S. Cl. ................ 425/557; 425/132; 425/561

(58) Field of Classification Search ............. 425/132, 425/542, 557, 558, 559, 560, 561, 587
See application file for complete search history.

(56) References Cited

U.S. PATENT DOCUMENTS

| | | | | |
|---|---|---|---|---|
| 3,020,591 A | * | 2/1962 | Breher et al. | 425/563 |
| 4,592,721 A | * | 6/1986 | Charlebois et al. | 425/558 |
| 5,167,971 A | * | 12/1992 | Gill et al. | 425/559 |
| 5,380,186 A | * | 1/1995 | Hettinga et al. | 425/557 |

\* cited by examiner

*Primary Examiner* — Tim Heitbrink
(74) *Attorney, Agent, or Firm* — Collard & Roe, P.C.

(57) ABSTRACT

A plastification and injection unit in injection-molding machines for processing of polymer materials, for example rubber, has a plastification screw that is disposed so as to rotate in a screw cylinder, which simultaneously represents the injection piston. The screw cylinder is disposed in an injection cylinder, in an axially displaceable manner. The injection cylinder can be connected with the sprue channel of an injection-molding die by way of a nozzle, and the injection piston has a back-flow barrier. The screw is axially displaceable in the screw cylinder by means of a separate drive. The screw tip projects out of the screw cylinder and has a closure body having a sealing surface for contact with the face surface of the screw cylinder.

5 Claims, 6 Drawing Sheets

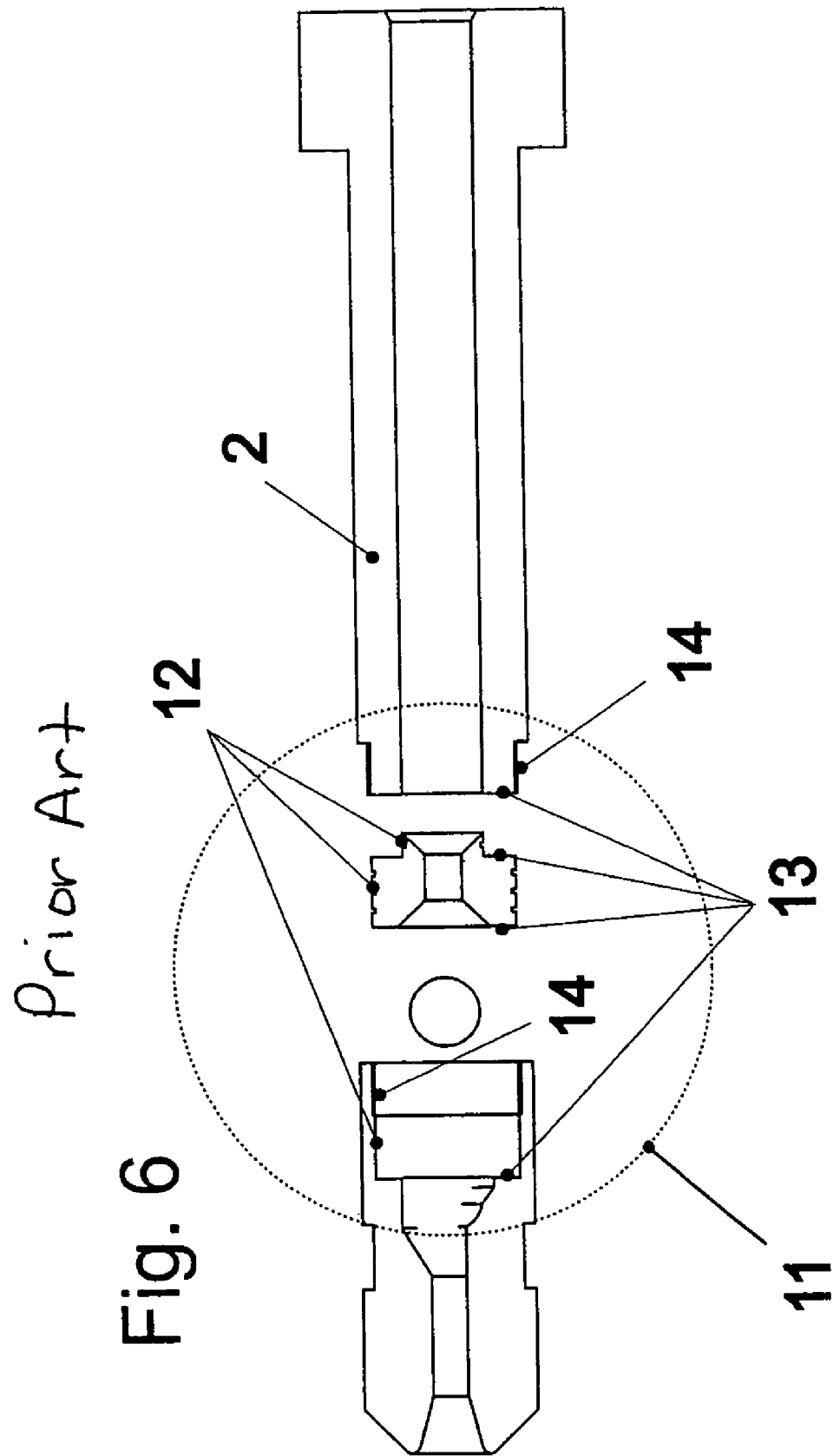

PLASTIFICATION AND INJECTION UNIT WITH BACK-FLOW BARRIER

CROSS REFERENCE TO RELATED APPLICATIONS

Applicants claim priority under 35 U.S.C. §119 of German Application No. 10 2008 061 845.4 filed Dec. 15, 2008 and German Application No. 10 2009 008 590.4 filed Feb. 12, 2009.

BACKGROUND OF THE INVENTION

1. Field of the Invention

The invention relates to a plastification and injection unit in injection-molding machines, for processing of polymer materials, for example rubber. The unit has a plastification screw that is disposed so as to rotate in a screw cylinder. The screw cylinder simultaneously represents the injection piston, which is disposed in an injection cylinder, in an axially displaceable manner. The injection cylinder can be connected with the sprue channel of an injection-molding die by way of a nozzle, and the injection piston has a back-flow barrier.

2. The Prior Art

These types of injection units work according to the so-called FIFO principle (first in-first out). During the plastification phase (filling of the injection cylinder with injection mass that is capable of flow, by means of rotation of the plastification screw), a connection channel from the screw chamber to the injection cylinder is required. To fill the mold, a high pressure must be built up in the injection cylinder, particularly in the case of viscous elastomer masses. In order to prevent return flow of the injection mass in the direction of the screw, the connection channel must be equipped with a kick-back valve (back-flow barrier).

With the known devices, a freely movable part (ball, cone, or the like), which is disposed in a separate chamber between the screw tip and piston tip in the injection piston, is used as a back-flow barrier, according to the model of a traditional hydraulic kick-back valve. This part is pressed against the seal seat by the mass pressure, thereby closing off the connection channel to the screw chamber. During the plastification process, this movable part is moved in the opposite direction by means of the mass pressure, thereby opening the connection channel toward the piston opening.

As stated, the movable part is situated in a separate chamber in the injection piston, thereby resulting in a relatively complicated structure. The piston consists of many individual parts having sensitive fits, sealing surfaces, and precision threads.

The injection channel from the screw cylinder to the piston outlet and the chamber for the movable part can, of course, become clogged during operation, by material that hardens, so that the injection unit frequently has to be cleaned. If this is to happen in a reasonable manner, disassembly for cleaning is unavoidable in the case of the conventional constructions. In this connection, these many individual parts have to be handled carefully. The slightest assembly errors (e.g. overlooked dirt particles or deficient lubrication) very quickly lead to failure of the entire construction. Only by means of the most precise cleaning of the individual parts and application of special grease to the thread flanks can an acceptable useful lifetime be achieved. The regular cleaning of the injection unit that is actually required is therefore very time-consuming and risky at present. A possible production failure is a threat. For this reason, injection units are thoroughly cleaned much too rarely nowadays. The old deposits that result from this, which burst off out of the injection unit and enter the molded parts, cause high scrap rates.

SUMMARY OF THE INVENTION

It is therefore an object of the invention to configure a unit of the type stated initially in such a manner that the back-flow barrier/injection piston unit has a simpler structure and that the cleaning effort is significantly reduced.

The invention accomplishes this object by a plastification and injection unit having a screw that is axially displaceable in the screw cylinder by means of a separate drive. The screw tip projects out of the screw cylinder and has a closure body having a sealing surface for contact with the face surface of the screw cylinder.

The closure body thus projects into the injection cylinder. The screw is pushed a short distance into the injection piston by the axial drive during plastification, so that the material can flow past the closure body. During or before the injection process, the screw is pulled backward again by the drive, so that the sealing surface of the closure body lies on the face surface of the screw cylinder, and return flow of the material is prevented. This is therefore an active back-flow barrier, in which the movable closure part or closure body, in contrast to the constructions known until now, is moved not solely by means of the mass flow, but rather by means of an additional drive. The innovation particularly consists in the fact that in this connection, the screw is simultaneously used as a "push rod" for the closure body. The closure body and screw thus form a unit and can also be configured in one piece.

The main advantage is the simple structure in the region of the injection mass. The entire construction essentially consists of two individual parts. Threaded connections and fittings that are susceptible to failure, in the region of the high mass pressure (injection piston/injection cylinder) are no longer required. The injection piston, i.e. the back-flow barrier, no longer has to be disassembled for thorough cleaning, thereby significantly reducing the cleaning effort and precluding damage that results from incorrect handling. Furthermore, because of the targeted, powerful, and therefore fast external activation, a reduction in the leakage flow is achieved. The volume injected into the mold can thus be metered in a significantly more precise manner. In order to allow lower scrap rates and in order to be able to implement fully automated systems, low variations in the injection volume between the individual injection procedures are very important.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 6 shows the device according to FIGS. 4 and 5 in the disassembled state.

DETAILED DESCRIPTION OF THE PREFERRED EMBODIMENT

Figure 1:
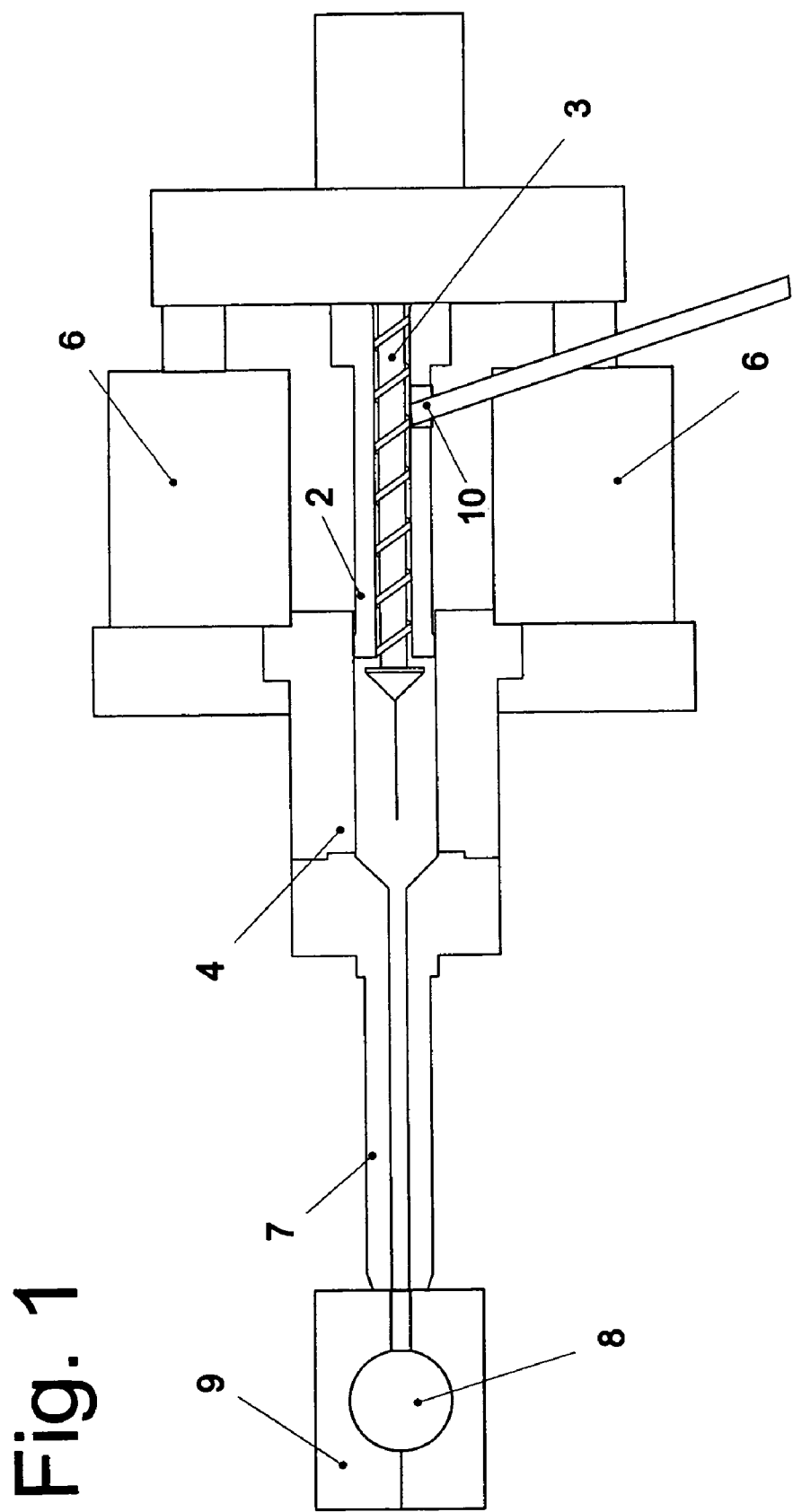
FIG. 1 shows a plastification and injection unit according to one embodiment of the invention.

FIG. 1 shows a plastification and injection unit generally indicated with the reference symbol 1. Unit 1 consists essentially of a plastification screw 3 disposed in a screw cylinder 2 so as to rotate. Screw cylinder 2 serves as an injection piston for the mass plasticized by screw 3, which is pressed into the injection cylinder using the so-called FIFO method (first in-first out). When injection cylinder 4 is filled, screw cylinder 2 is moved into injection cylinder 4 by means of hydraulic cylinders 6, thereby pressing the plasticized mass out of the injection cylinder into cavity 8 of an injection-molding die 9, by way of nozzle 7.

The number 10 refers to the intake shaft in the screw cylinder for the material (rubber) to be plasticized.

Figure 4:
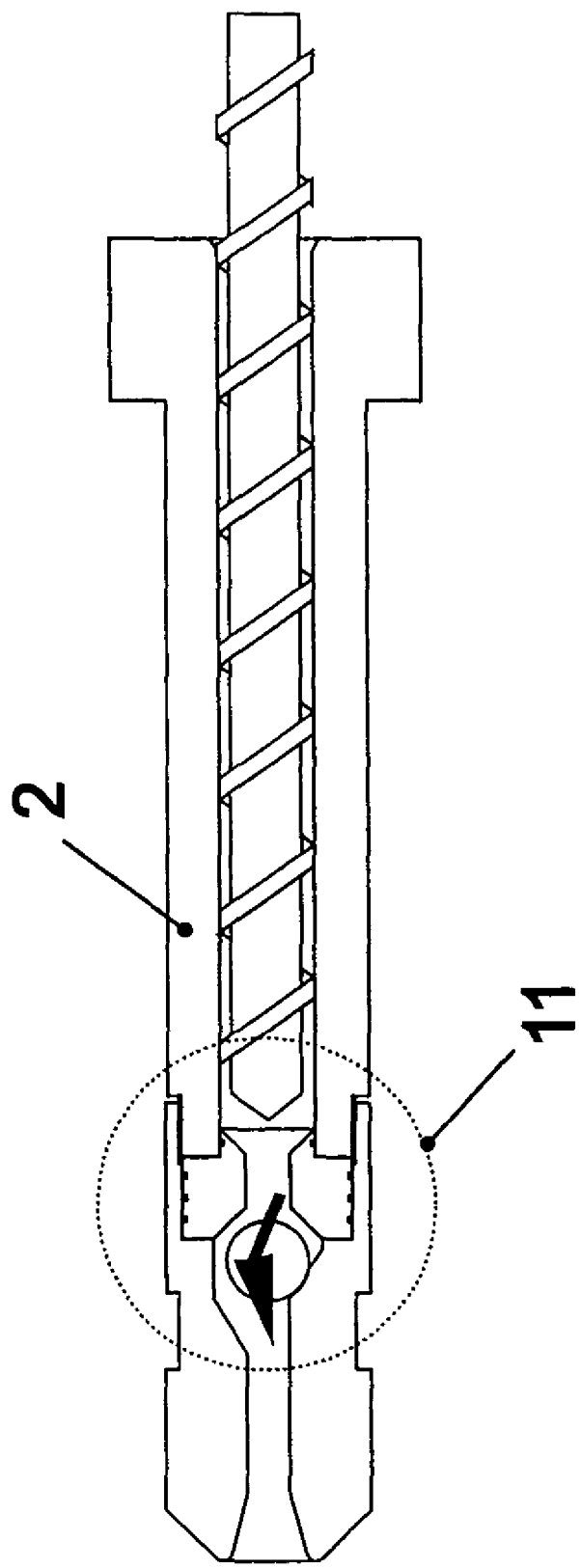
FIG. 4 shows a screw cylinder and injection piston according to the state of the art, in the open position.
Figure 5:
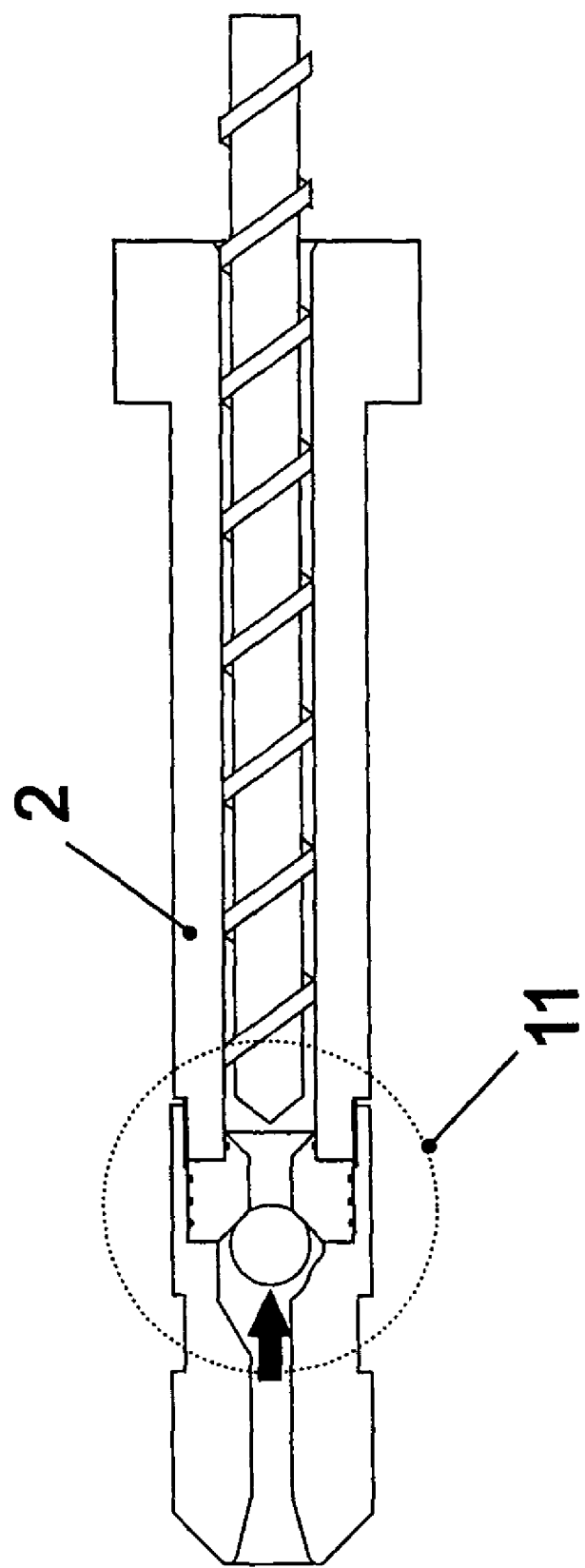
FIG. 5 shows the device according to FIG. 4 in the closed position.

In the prior art according to FIGS. 4 to 6, the screw cylinder is structured in multiple parts. It consists of the actual cylinder for accommodating the screw and a region referred to as the back-flow barrier 11. Back-flow barrier 11 consists of a freely movable part, in this case a ball, which is disposed in a specially provided chamber in the region in front of the screw tip.

As is particularly clearly evident from FIG. 6, the structure of back-flow valve 11 is rather fragile, since sensitive fits 12, sealing surfaces 13, and precision threads 14 are provided. Furthermore, the shaping of the chamber that accommodates the ball is also rather complicated.

Figure 2:
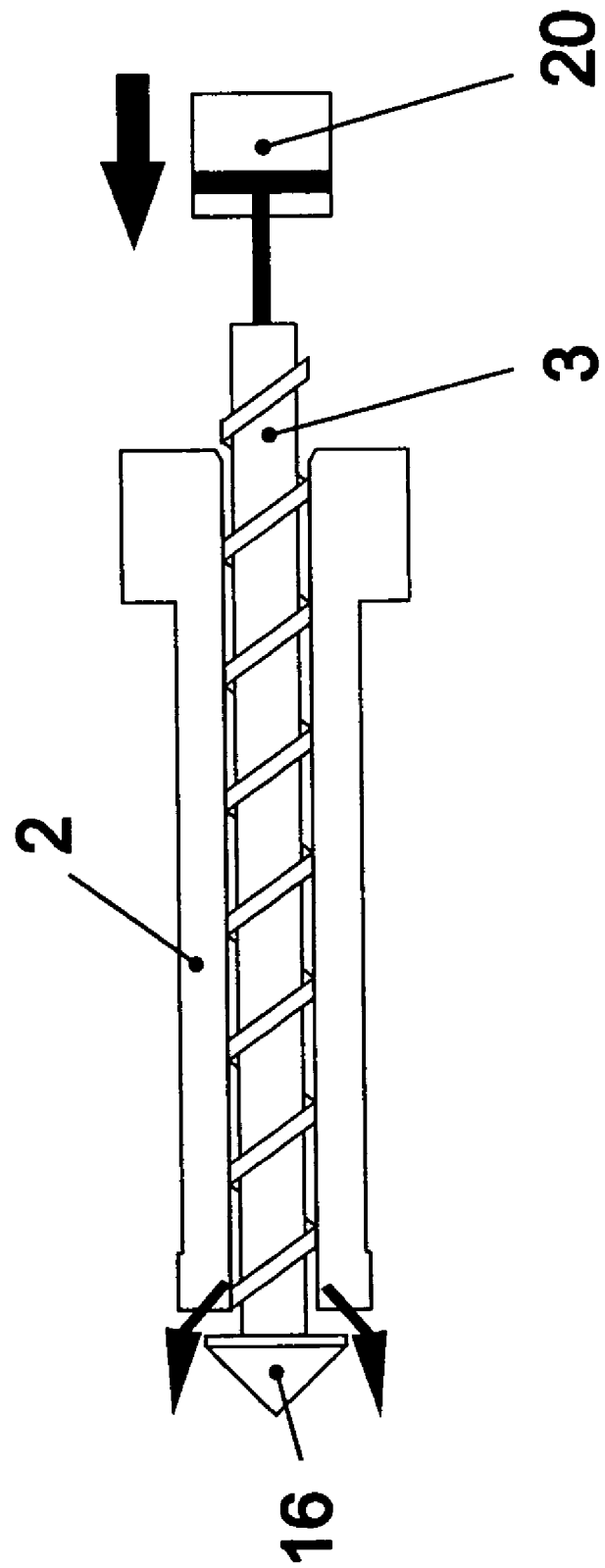
FIG. 2 shows a screw cylinder with screw and closure body in the open position.
Figure 3:
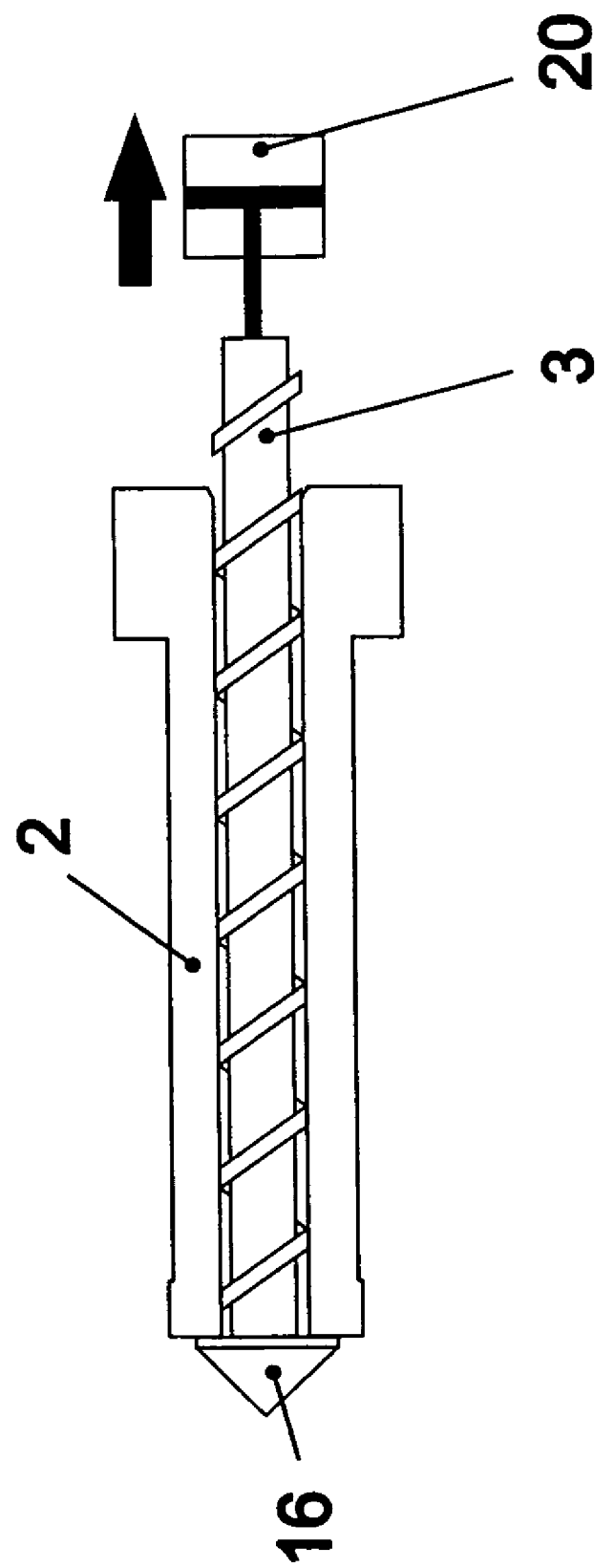
FIG. 3 shows the device according to FIG. 2 in the closed position.

A plastification and injection unit of the type according to the invention is shown in FIGS. 1 to 3.

Here, the back-flow barrier is formed by a closure body 16, which forms the front part of screw 3 and projects into the injection cylinder 2.

For this purpose, screw 3 is provided with an axial drive 20, which makes it possible for closure body 16 to be lifted off from the seal seat and thus to release the path for the plasticized material into injection cylinder 4.

In the present exemplary embodiment, closure body 16 is configured as a cone, in which the cone base, i.e. the remaining edge region, forms a sealing surface that lies on the front face side of screw cylinder 2 in the closed position.

Accordingly, while only a few embodiments of the present invention have been shown and described, it is obvious that many changes and modifications may be made thereunto without departing from the spirit and scope of the invention.

What is claimed is:

1. A plastification and injection unit in injection-molding machines for processing of polymer materials, comprising:
   an injection cylinder adapted to be connected to a sprue channel of an injection molding die by way of a nozzle, said injection cylinder having a back-flow barrier;
   a screw cylinder forming an injection piston and being disposed in the injection cylinder and being axially displaceable in the injection cylinder;
   a plastification screw rotatably disposed in the screw cylinder; and
   a separate drive for axially displacing the screw in the screw cylinder,
   wherein a screw tip is connected to said plastification screw, said screw tip projecting out of the screw cylinder, said screw tip having a closure body with a sealing surface for contact with a face surface of the screw cylinder to shut off flow of the polymer materials.

2. The plastification and injection unit according to claim 1, wherein the screw and closure body are configured in one piece.

3. The plastification and injection unit according to claim 1, wherein the drive for the axial displacement of the screw is a pressure medium cylinder.

4. The plastification and injection unit according to claim 1, wherein the axial displacement of the screw takes place by way of a thread-guided rotational movement.

5. The plastification and injection unit according to claim 1, wherein the closure body is a cone whose tip points into the injection cylinder and an edge of a base of the cone is configured as the sealing surface.

* * * * *

UNITED STATES PATENT AND TRADEMARK OFFICE
CERTIFICATE OF CORRECTION

| | | |
|---|---|---|
| PATENT NO. | : 7,972,131 B2 | Page 1 of 1 |
| APPLICATION NO. | : 12/592090 | |
| DATED | : July 5, 2011 | |
| INVENTOR(S) | : Kuechler et al. | |

It is certified that error appears in the above-identified patent and that said Letters Patent is hereby corrected as shown below:

In particular, on the cover page, Column 1, item [73], please change "Frideingen" to correctly read: --Fridingen--.

Signed and Sealed this
Sixteenth Day of August, 2011

David J. Kappos
*Director of the United States Patent and Trademark Office*